UNITED STATES PATENT OFFICE.

KARL FARKAS, OF NEW YORK, N. Y., ASSIGNOR OF ONE-HALF TO GUY V. WILLIAMS, OF NEW YORK, N. Y.

PROCESS OF PRODUCING FINE TUNGSTOUS OXIDS.

1,061,058.　　Specification of Letters Patent.　　Patented May 6, 1913.

No Drawing.　Application filed August 10, 1909.　Serial No. 512,145.

*To all whom it may concern:*

Be it known that I, KARL FARKAS, a citizen of the Kingdom of Hungary, and a resident of New York, in the county and State of New York, have invented certain new and useful Improvements in Processes of Producing Fine Tungstous Oxids, of which the following is a specification.

This invention has reference to improvements in the production of fine and pure powder for making metallic filaments which are used in incandescent electric lamps. Such filaments consume relatively little current in comparison to carbon filaments but they are very fine and delicate. They consist of highly refractory chemical elements which are practically infusible such as, for instance, tungsten and other highly refractory chemical elements and metals. It is essential for the good quality of such filaments that they be made of pure material. It is quite difficult to remove all traces of impurities and additions during the process of manufacturing the light producing conductors and the impurities impair the light producing power and life time of the conductor and consume more current than the highly refractory elementary substance of which the filament is essentially composed.

In order to obtain fine and pure powder of refractory substances for such metallic filaments of uniform homogeneous structure it is important that the powder from which they are made is very fine and pure and imperceptible to touch. This impalpable pure powder, prepared for instance from tungsten compounds is made in accordance with this invention in the following manner: The yellow anhydrid of tungstic acid is placed into a hard fusible tube and a current of dry carbon dioxid constantly passed through said tube. When all the air in the tube has been replaced by the carbon dioxid the tube is heated thereby heating the anhydrid of the tungstic acid. This treatment of the anhydrid of the tungstic acid in a constantly renewed carbon dioxid atmosphere is continued until the same assumes a deep black color. In this manner a very fine impalpable black powder is formed from the yellow anhydrid of tungstic acid which then is passed through the very finest silk sieves. This fine powder represents tungstous oxids which explains the formation of the fine black impalpable powder from the yellow anhydrid of tungstic acid.

The described process constitutes a contact reaction. Such process is accelerated for obtaining useful results by contact of the active substance with another substance, the so called contact substance or catalytic agent, which is unchanged at the end of the reaction. This is the general nature of a contact reaction. In the present process the contact substance or catalytic agent is further gradually renewed. The carbonic acid gas acts on the highly heated oxids and produces therefrom suboxids or oxids of a low valence which is apparent from the change in color and the fineness of the resulting powder for instance the yellow tungstic oxid $WO_3$ is first reduced to $W_2O_5$ and then to $WO_2$ or the dioxid of tungsten.

$$2WO_3 = W_2O_5 + O$$
$$W_2O_5 = 2WO_2 + O$$

Upon further reduction the brown dioxid of tungsten assumes a deep black color and tungstous oxids are formed which are not of uniform composition. The fact that the yellow tungstic oxid changes into the bluish $W_2O_5$ then into the brown $WO_2$ and then into a dark black mass plainly shows the transformation effected by this process.

The fine and pure powder of refractory substances, particularly of tungstous oxids thus obtained represents an excellent material for producing metallic filaments which during the heating of same by the electric current become hardened and very tough and may easily be handled during the process of manufacturing the incandescent lamps.

I claim as my invention:

1. The process of producing fine impalpable powder of tungstous oxids from yellow tungstic anhydrid by contact action consisting in heating the tungstic anhydrid in a constantly renewed atmosphere of carbon dioxid until black tungstous oxids are produced in form of fine powder imperceptible to touch.

2. The process of producing fine impalpable powder of tungstous oxids from the yellow tungstic anhydrid by contact action consisting in subjecting said yellow tungstic anhydrid to a high heat in a constantly renewed atmosphere of carbon dioxid until black tungstous oxids are produced in form of fine powder imperceptible to touch, and separating the finest powders by means of fine silk sieves.

Signed at New York, N. Y., this 9th day of August, 1909.

KARL FARKAS.

Witnesses:
LUDWIG K. BOHM,
GUY V. WILLIAMS.